United States Patent
Malone

[11] Patent Number: 6,159,545
[45] Date of Patent: Dec. 12, 2000

[54] METHOD FOR APPLYING A FLUID MATERIAL IN JOINT REGIONS AROUND AN AIRFOIL

[75] Inventor: Stephen C. Malone, Enfield, Conn.

[73] Assignee: United Technologies Corporation, Hartford, Conn.

[21] Appl. No.: 09/258,726

[22] Filed: Feb. 26, 1999

[51] Int. Cl.[7] .................................................... B05D 5/00
[52] U.S. Cl. .................. 427/287; 29/889.21; 219/85.22; 228/52; 416/213 R
[58] Field of Search ...................... 219/85.22; 29/889.21; 228/52; 416/213 R; 403/272; 427/287

[56] References Cited

U.S. PATENT DOCUMENTS

| | | | |
|---|---|---|---|
| 3,967,353 | 7/1976 | Pagnotta et al. | 29/156.8 R |
| 4,096,615 | 6/1978 | Cross | 29/156.8 R |
| 4,205,774 | 6/1980 | Madden et al. | 228/32 |
| 5,320,273 | 6/1994 | Goenka et al. | 228/33 |
| 5,328,085 | 7/1994 | Stoops et al. | 228/33 |

OTHER PUBLICATIONS

Ultra System, dispensing components, EFD, ". . . the key to productive dispensing . . . ", 12 pages (1995) (no month date).

Operating Guide 800/900 Series Dispensers, Model 800. 815. 900. 915, 24 pages (1995) (no month date).

*Primary Examiner*—Katherine A. Bareford

[57] ABSTRACT

Material in fluid form is applied to a region where a joint is to be formed between an airfoil and an adjacent structure by simultaneously directing streams of the material into the joint region on the suction side of the airfoil and into the joint region on the pressure side of the airfoil. The material may be so applied using a syringe type applicator that has a nozzle with a first arm and a second arm. The first arm is in flow communication with a source of the material and the suction side surface of the airfoil. The second arm is flow communication with a source of the material and the pressure side surface of the airfoil. Applying the material simultaneously to the joint regions on the suction side and the pressure side of the airfoil reduces the amount of time and effort needed to apply such material. In addition, it virtually eliminates the possibility that the material deposited in the joint region on one side of the airfoil will harden prior to the deposition of the material in the joint region on the other side of the airfoil, and therefore reduces the likelihood that the braze material on the one side will be displaced from the joint region while depositing the material on the other side, as sometimes occurs in the prior art.

9 Claims, 3 Drawing Sheets

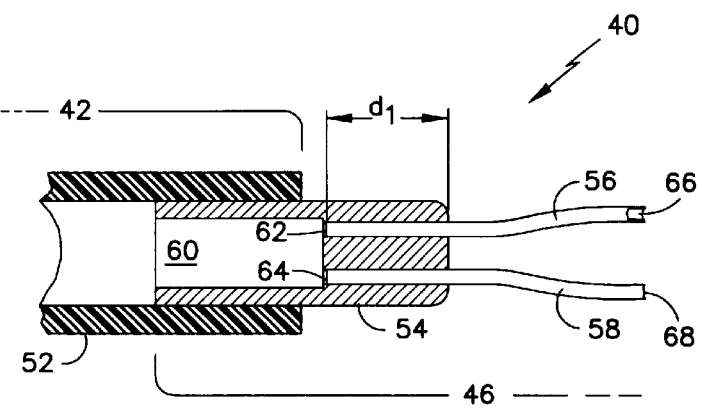
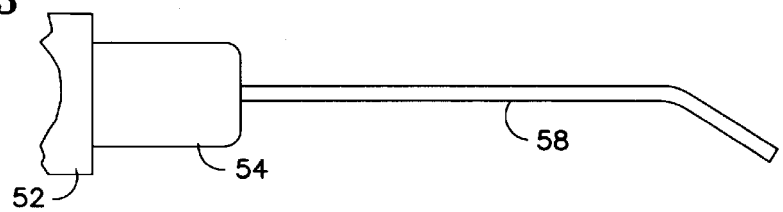
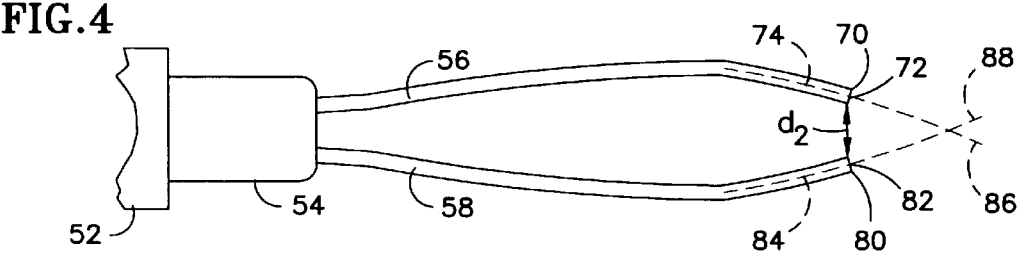
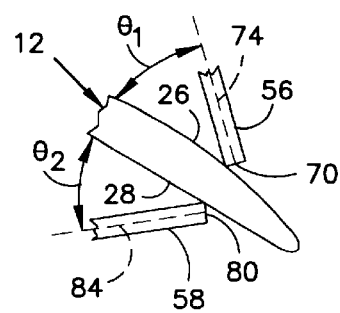

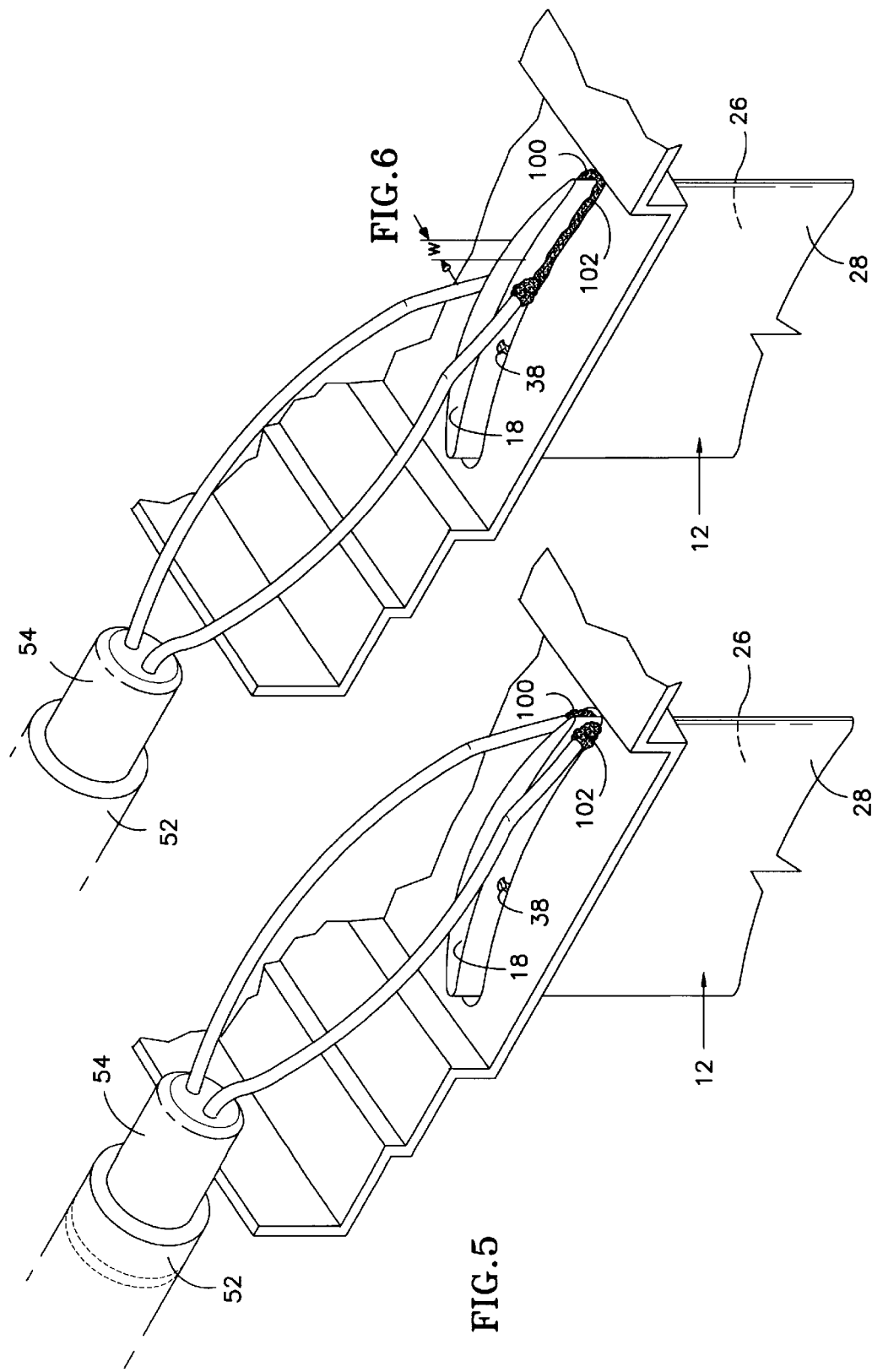

METHOD FOR APPLYING A FLUID MATERIAL IN JOINT REGIONS AROUND AN AIRFOIL

TECHNICAL FIELD

This invention relates to a method and an apparatus for applying a material in fluid form into joint regions between an airfoil and an adjacent structure, and more particularly to a method and an apparatus that simultaneously directs streams of the material into a joint region on a suction side of the airfoil and into a joint region on a pressure side of the airfoil.

BACKGROUND

Gas turbine engines often have arrays of airfoils joined to other structures by braze joints that extend along the suction side surface and the pressure side surface of the airfoils. Such joints are typically formed by depositing a braze material into regions where the joint is to be formed, referred to herein as joint regions. The braze material is typically in fluid form and may comprise a mixture of powdered alloy material and binder material. Heat is then applied to cause the braze material to melt and fill the joint regions, wherein upon cooling, the braze material forms the desired joint.

A traditional method for depositing the braze material uses a syringe type applicator filled with braze material. The applicator has a nozzle for dispensing the braze material. The nozzle of the applicator is first guided along the joint region between the suction side of the airfoil and the structure to direct a stream of braze material into such joint region. The nozzle of the applicator is then guided along the joint region between the pressure side of the airfoil and the structure to direct a stream of braze material into the latter joint region. For convenience, streams are sometimes first deposited into the joint regions along the suction sides of an entire array of airfoils, and then streams are deposited into the joint regions along the pressure sides.

The above described method for depositing the braze material has two primary drawbacks. First, the time and the effort required to apply the braze material is approximately twice that required to apply the braze material into the joint region on just one side of the airfoil. Second, the braze material in the joint region on the suction side of the airfoil may harden and thereby form a braze structure prior to the deposition of the braze material in the joint region on the pressure side. Such braze structure does not adhere to the airfoil to the extent that the structure adheres internally. Consequently, nudging of the braze structure, which can occur while depositing braze material along the pressure side of the airfoil, in particular at the leading and/or trailing edge of the airfoil, may displace the braze structure from the joint region to an extent that the braze material from the structure might not flow into the joint region during heating.

SUMMARY

An object of the present invention is to provide an improved method and apparatus for depositing a material, such as for example, a braze material, in fluid form into a joint region between an airfoil and an adjacent structure.

According to a first aspect of the present invention, a method for applying a material in fluid form into a joint region between an airfoil and an adjacent structure includes simultaneously directing streams of the material into the joint region on the suction side of the airfoil and into the joint region on the pressure side of the airfoil.

In accordance with a detailed aspect of the invention, the step of simultaneously directing streams of the material includes forming a source stream of material and splitting the source stream into a first stream and a second stream.

According to a second aspect of the present invention, an apparatus for use in carrying out the above method has a nozzle that includes a first arm in flow communication with a source of material and the suction side surface of the airfoil and further includes a second arm in flow communication with the source of material and the pressure side surface of the airfoil.

The present invention reduces the amount of time and effort needed to apply material in fluid form to the joint regions between an airfoil and an adjacent structure. In addition, the invention virtually eliminates the possibility that the material deposited in the joint region on one side of the airfoil will harden prior to the deposition of the material in the joint region on the other side of the airfoil, and therefore reduces the likelihood that the braze material on the one side will be displaced from the joint region while depositing the material on the other side, as sometimes occurs in the prior art.

These and other objects, features, and advantages of the present invention will become more apparent in view of the following detailed description, accompanying drawings, and claims.

BRIEF DESCRIPTION OF THE DRAWINGS

FIG. 2 is a fragmentary cross section view, in the direction of 2—2 of FIG. 1, of the applicator of FIG. 1;

FIG. 3 is a fragmentary side view of the applicator of FIG. 1;

FIG. 4 is a fragmentary top view of the applicator of FIG. 1, in a free state;

FIG. 5 is a view of the vane stage and the applicator of FIG. 1, at the start of the application of a braze material to the joint regions in the vane stage;

FIG. 6 is a view of the vane stage and the applicator of FIG. 1, subsequent to the view of FIG. 5; and FIG. 7 is a fragmentary top view of the applicator of FIG. 1 positioned around an airfoil in the vane stage of FIG. 1.

BEST MODE FOR CARRYING OUT THE INVENTION

Figure 1:
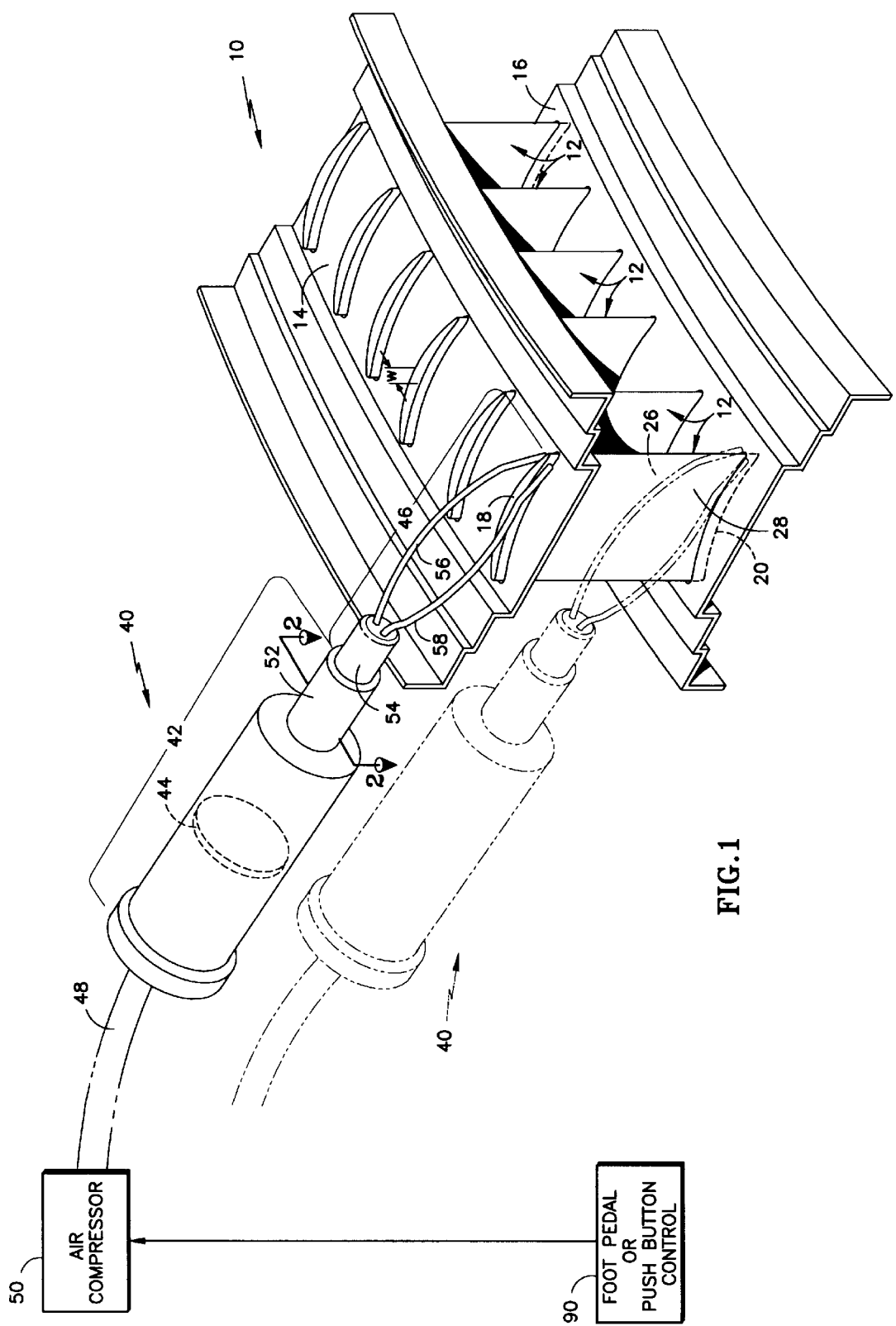
FIG. 1 is perspective fragmentary view of a vane stage for a gas turbine engine, along with an applicator according to one embodiment of the present invention for applying braze material to joint regions in the vane stage.

The present invention is disclosed herein with respect to a best mode embodiment for use in brazing an airfoil to an adjacent structure within a vane stage 10 for a stator assembly in a gas turbine engine (not shown). Referring now to FIG. 1, a vane stage 10 has a plurality of vanes, i.e. airfoils 12, that extend between a radially outer case 14 and a radially inner shroud 16. Each of the airfoils 12 has a radially outer end 18, a radially inner end 20, a leading edge, a trailing edge, a suction side surface 26 and a pressure side surface 28. The outer case 14 has a plurality of slots to receive the radially outer ends of the airfoils. The inner shroud 16 has a plurality of slots to receive the radially inner ends of the airfoils. Initially, each airfoil 12 is spot welded 38 (FIG. 5) to the outer case 14 and/or the inner shroud 16 to temporarily maintain the airfoil 12 in proper relation to the outer case 14 and the inner shroud 16. With the parts temporarily maintained in substantially the position shown in FIG. 1, each of the airfoils 12 is to be joined by brazing to the outer case 14 and the inner shroud 16.

A syringe type applicator 40 for distributing braze material into joint regions around the airfoils 12 includes a barrel 42, a piston 44, and a nozzle 46. The barrel 42 is adapted to hold a supply of braze material in fluid form. The barrel 42 has a first end in flow communication via a flexible tube 48 to an air compressor 50, and has a second end with a neck 52. The piston 44 is slidably disposed within the barrel 42. The barrel 42 and the piston 44 are identical to those used in prior art applicators for depositing braze material.

The nozzle 46 has a base 54, a first arm 56, and a second arm 58. The base 54 attaches to the neck 52 of the barrel 42. The attachment may be of a press fit type, as shown, or of a type used in prior art applicators comprising an outward projection on the nozzle 46 base 54 that engages a threaded groove on an inner surface of the neck 52.

Referring now to FIG. 2, in a cross section view of a portion of the applicator 40, the base 54 of the nozzle 46 has a chamber 60 and two passages 62, 64 in flow communication therewith. The chamber 60 is, in turn, in flow communication with the neck 52 of the barrel 42. The passages 62, 64 may be formed in any suitable manner including but not limited to drilling.

The first arm 56 and the second arm 58 extend into the passages 62, 64. The first arm 56 has a channel 66 in flow communication with the chamber 60 thereby providing a first flow path for the braze material. The second arm 58 has a channel 68 in flow communication with the chamber 60 thereby providing a second flow path for the braze material. The first arm 56 and the second arm 58 are secured to the base 54 of the nozzle 46 by way of a circumference fit with the passages 62, 64, or alternatively, by bonding for example with silver solder material. In the case of bonding, the arms extend a distance $d_1$ into the passages 62, 64, such distance $d_1$ being of a length sufficient (e.g., 0.3 inches) to prevent the solder material from reaching the ends of the arms and obstructing the flow path for the braze material. In this regard, it may be desirable for the ends of the arms 56, 58 to extend into the chamber 60 of the base 54 and flare outward.

Referring now to FIG. 4, the first arm 56 has a tip 70 with an orifice 72 for dispensing braze material along an axis of discharge 74. The second arm 58 has a tip 80 with an orifice 82 for dispensing braze material along an axis of discharge 84. An extension 86 of the axis of discharge 74 of the first arm 56 extends past an extension 88 of the axis of the discharge 84 of the second arm 58. A side view of the nozzle 46 is shown in FIG. 3. Although not required, each of the arms may be formed of material having a spring characteristic that tends to restore the arm to its original shape after the arm is flexed.

Distributing braze material into the joint regions is carried out by first placing a supply of braze material into the barrel 42 of the applicator 40. The applicator 40 is then positioned as shown in FIG. 1, such that the first arm 56 is in flow communication with the joint region along the suction side surface 26 of the airfoil 12 and the second arm 58 is in flow communication with the joint region along the pressure side surface 28 of the airfoil 12. The tips of the arms may contact the surface of the airfoil and the surface of the outer case, thereby making it easier to position the applicator as described above and distribute braze material into the joint region. The shapes of the arms help maintain clearance elsewhere to the airfoil 12 to help prevent interference with the flow communication between the arms and the joint regions. Further, although not limited to such, each axis of discharge 74, 84 (FIG. 4) may form an angle $\theta_1$, $\theta_2$ (FIG. 7) of about 25 degrees relative to the respective side surface of the airfoil. Such an angle is suitable for depositing the braze material yet allows a technician to have good visibility of the joint region.

A technician may use a foot pedal or push button 90 to control the air compressor 50 and thereby provide air pressure that forces the piston 44 toward the supply of braze material, which forces the supply of braze material toward the neck 52 of the barrel 42 and results in a source stream of braze material into the chamber 60 of the nozzle 46. Within the nozzle 46, the source stream of braze material splits into a first stream, which flows through the flow path provided by the first arm 56, and a second stream, which flows through the flow path provided by the second arm 58.

Referring now to FIGS. 5 and 6, the first arm 56 directs the first stream 100 of the braze material into the joint region on the suction side surface 26 of the airfoil 12. Simultaneous therewith, the second arm 58 directs the second stream 102 of the braze material into the joint region on the pressure side surface 28 of the airfoil 12. If desired, the technician may gradually guide the tip 70 of the first arm 56 from the joint region at the leading edge of the suction side surface 26 of the airfoil 12 to the joint region at the trailing edge of the suction side surface 26 of the airfoil, to thereby direct a stream of braze material into a substantial portion of the joint region along the suction side surface 26 of the airfoil 12. As the first arm 56 is so guided, the shape of the nozzle 46 causes the second arm 58 to be generally guided along the joint region on the pressure side surface 28 of the airfoil, to thereby direct a stream of braze material into a substantial portion of the joint region along the pressure side surface 28 of the airfoil 12. The technician controls the air compressor 50 so as to achieve the desired size and shape for the streams out of the arms. The presence of an arm on each side of the airfoil helps limit side to side movement of the nozzle, thereby helping to limit the distance between each arm and the respective surface of the airfoil. Although not required, the tips of the arms may be separated in the free state by a distance $d_2$ (FIG. 4) that is less that the width w (i.e., the distance from the suction side surface he pressure side surface) of some portions of the airfoil 12. If so, such portions of the airfoil 12 force the tips apart, thereby causing the arms to flex, whereby each tip presses against the airfoil with a bias force resulting from the spring characteristics of the arms. In addition, each of the arms exerts a restorative force should the nozzle drift such that one arm pulls away from the airfoil. The bias force and the restorative force assist in positioning and guiding the arms as described above, and thereby assist in directing the streams of braze material. Once the braze material is deposited in the joint regions, the vane stage 10 may be placed in a furnace, wherein heat is applied to cause the braze material to melt and fill the joint regions and upon cooling, result in formation of a joint.

By simultaneously applying material to joint regions on both sides of an airfoil, the present invention reduces the amount of time and effort needed to apply such braze material. In addition, the invention virtually eliminates the possibility that the material deposited in the joint region on one side of the airfoil will harden prior to the deposition of the material in the joint region on the other side of the airfoil, and therefore reduces the likelihood that the braze material on the one side will be displaced from the joint region while depositing the material on the other side, as sometimes occurs in the prior art.

The material, the diameter, the length and the shape of the first arm 56 and the second arm 58 are selected to suit the particular application. In one embodiment, each of the arms is formed of stainless steel tubing having an outer diameter of about 0.050 inches, an inner diameter of 0.030 inches, and a length of about two inches. In such embodiment the base 54 of the nozzle 46 has a length of about 0.7 inches and a width of about 0.25 inches, and the passages 62, 64 are disposed a distance of about 0.05 inches from the outside surface of the base 54 of the nozzle 46.

The method and apparatus of the present invention is suitable for use in original equipment manufacture and/or repair. Further, although disclosed with respect to an airfoil in a stator assembly, which does not rotate, the present invention may also be applied in forming joints to airfoils in rotating assemblies within a gas turbine engine. In some applications it may be desirable as a preliminary step (i.e., in advance of depositing braze material) to apply metal filler material (e.g. metal filler material) into some or all of the joint regions so as to result in a joint having added structural strength in such regions.

While the present invention has been described with reference to a best mode embodiment, this description is not meant to be construed in a limiting sense. Various modifications of the best mode embodiment, as well as further embodiments of the present invention, will be apparent to persons skilled in the art upon reference to this description without departing from the spirit of the invention, as recited in the claims appended hereto. For example, the material in fluid form need not be braze material but rather may be any material in fluid form. In addition, the nozzle 46 described herein may be used with any type of applicator, including non-syringe types. The driving force for an applicator may be provided in any suitable manner and is not limited to an air compressor 50. The applicator need not be manually guided and the driving force need not be manually controlled, but rather, may be guided and controlled, respectively, using automated machinery. If an air compressor is used, it may be of any suitable type including but not limited to a pulse type. Further, the materials and the shape of the nozzle 46 and the manner in which the nozzle 46 is used will depend on the application. In one alternative embodiment, the arms may comprise plastic material, rather than metal material, and may be shaped using a molding process. In some embodiments, the arms may be shaped and positioned so as to force braze material deeper into the joint regions than in other embodiments. The arms need not have shapes similar to each other. Moreover, it may actually be preferable in some applications for one arm to have a different shape than the other. In some embodiments, it may be desirable to invert the applicator 40 such that the first arm 56 is disposed along the pressure side surface 28 and the second arm 58 is disposed along the suction side surface 26. The first arm and the second arm need not share a source of material but rather may each have their own source of material. Furthermore, any bias and/or restorative forces used to help position and/or guide the nozzle are not limited to that provided by any spring characteristics of the arms, but rather may be provided by any suitable means including but not limited to discrete spring assemblies that may be disposed in the base of the nozzle. In addition, it is not necessary to start the deposition at the leading edge and end at the trailing edge. For example, the deposition could start from the trailing edge and end at the leading edge. Alternatively, the application may start and/or end somewhere between the leading and the trailing edge. Still further, the deposition may be carried out as a series of depositions, e.g., a deposition from midchord to trailing edge in combination with a deposition from midchord to leading edge. While such a series of depositions may be used in any situation, it may be particularly advantageous where the airfoil 12 has significantly greater curvature than that of the airfoil 12 in FIGS. 1–6. It is, therefore, contemplated that the appended claims will cover any such modifications or embodiments as fall within the true scope of the invention.

What is claimed is:

1. A method for applying a material in fluid form to a joint region in a flow directing assembly, the flow directing assembly having an airfoil and an adjacent structure joined to the airfoil by a joint in the finished condition, wherein the airfoil has a suction side surface and a pressure side surface which converge toward a trailing edge of the airfoil, the method comprising:

disposing a first stream of the material on the suction side of the airfoil and simultaneously disposing a second stream of the material on the pressure side of the airfoil; and directing the first stream of the material into the joint region on the suction side of the airfoil and simultaneously directing the second stream of the material into the joint region on the pressure side of the airfoil.

2. The method of claim 1 wherein the step of directing includes the step of forming a source stream of material and splitting the source stream into a first stream and a second stream.

3. A method for forming a joint in a region in a flow directing assembly, the flow directing assembly having an airfoil and an adjacent structure joined to the airfoil by the joint in the finished condition, wherein the airfoil has a suction side surface and a pressure side surface which converge toward a trailing edge of the airfoil, the method comprising:

disposing a first stream of a material in fluid form on the suction side of the airfoil and simultaneously disposing a second stream of the material in fluid form on the pressure side of the airfoil;

directing the first stream of the material into the joint region on the suction side of the airfoil and simultaneously directing the second stream of the material into the joint region on the pressure side of the airfoil; and heating the material to cause the material to flow so as to form the joint between the airfoil and the structure.

4. The method of claim 3 wherein the step of directing includes the step of forming a source stream of material and splitting the source stream into a first stream and a second stream.

5. A method for applying a material in fluid form to a joint region in a flow directing assembly, the flow directing assembly having an airfoil and an adjacent structure joined to the airfoil by a joint in the finished condition, wherein the airfoil has a suction side surface and a pressure side surface which converge toward a trailing edge of the airfoil, the method comprising:

providing an applicator having a first arm and a second arm, the first arm being in flow communication with a source of material and having a flow path for a stream of the material, the second arm being in flow communication with a source of material and having a flow path for a stream of the material; and positioning the applicator relative to the airfoil such that the first arm directs its associated stream of material into the joint region on the suction side of the airfoil, and the second arm directs its associated stream of material into the joint region on the pressure side of the airfoil.

6. The method of claim 5 wherein the applicator has a chamber in flow communication with the first arm and the second arm, and the step of providing includes the step of disposing the source of material that is in flow communication with the first arm and the source of material that is in flow communication with the second arm in the chamber.

7. The method of claim 5 wherein the step of positioning includes positioning the applicator such that the first arm contacts the suction side of the airfoil and the adjacent structure, and the second arm contacts the pressure side of the airfoil and the adjacent structure.

8. The method of claim 7 wherein at least one of the first arm and the second arm comprises a resilient material having springiness sufficient to maintain a bias force which holds said one arm in contact with said joint region as said material is directed by said applicator into said joint region.

9. The method of claim 8 wherein the airfoil has a width from the suction side to the pressure side, the first arm has a tip, and the second arm has a tip spaced apart from the tip of the first when disengaged from said airfoil by a distance that is less than the width of the airfoil.

* * * * *